(12) United States Patent
Okabe et al.

(10) Patent No.: US 12,072,273 B2
(45) Date of Patent: Aug. 27, 2024

(54) MEASURING METHOD AND MEASURING APPARATUS

(71) Applicant: Kioxia Corporation, Tokyo (JP)

(72) Inventors: Kasumi Okabe, Nagoya Aichi (JP); Takeshi Higuchi, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 253 days.

(21) Appl. No.: 17/841,819

(22) Filed: Jun. 16, 2022

(65) Prior Publication Data

US 2023/0194406 A1    Jun. 22, 2023

(30) Foreign Application Priority Data

Dec. 16, 2021  (JP) ................................ 2021-204364

(51) Int. Cl.
G01N 15/08    (2006.01)
(52) U.S. Cl.
CPC ....... G01N 15/082 (2013.01); G01N 15/0806 (2013.01); *G01N 2015/0846* (2013.01)
(58) Field of Classification Search
CPC .... G01N 15/00; G01N 15/08; G01N 15/0806; G01N 15/082
See application file for complete search history.

(56) References Cited

U.S. PATENT DOCUMENTS

| | | | | |
|---|---|---|---|---|
| 3,861,196 | A | * | 1/1975 | Domenighetti ........ G01N 33/24 277/646 |
| 10,955,328 | B2 | * | 3/2021 | Giglia ................ G01N 33/0011 |
| 2008/0226900 | A1 | | 9/2008 | Nagai et al. |

FOREIGN PATENT DOCUMENTS

| JP | 2018-22807 A | 2/2018 |
|---|---|---|
| JP | 2020-98922 A | 6/2020 |
| WO | WO 2007/023708 A1 | 3/2007 |

OTHER PUBLICATIONS

Japanese Standards Assoc., Japanese Industrial Standard JIS K 7126-1:2006(E), "Plastics—Film and sheeting—Determination of gas-transmission rate—Part 1: Differential-pressure method," 19 pages (2006).

* cited by examiner

*Primary Examiner* — Nguyen Q. Ha
(74) *Attorney, Agent, or Firm* — Finnegan, Henderson, Farabow, Garrett & Dunner, LLP

(57) ABSTRACT

A measuring method includes: placing resist 20 on a surface of a test film; pressing a template 30 against the resist 20 placed on the surface of the test film; measuring a size of a void formed in the resist 20 after pressing the template 30 against the resist 20; and determining gas permeability of the test film based on the size of the void.

10 Claims, 15 Drawing Sheets

MEASURING METHOD AND MEASURING APPARATUS

CROSS-REFERENCE TO RELATED APPLICATION

This application is based upon and claims the benefit of priority from the prior Japanese Patent Applications No. 2021-204364, filed on Dec. 16, 2021, the entire contents of which are incorporated herein by reference.

FIELD

The embodiment relates to a measuring method and a measuring apparatus.

BACKGROUND

Conventionally, there is a differential pressure method as a method for measuring gas permeability of a film, a sheet, or the like. Specifically, the differential pressure method is the following test method. First, the test piece is mounted in a state of being hermetically sealed between the two chambers of the gas permeability cell. Subsequently, the low pressure chamber is evacuated and the test gas is introduced into the high pressure chamber. As a result, the test gas passes through the test piece and permeates into the low pressure chamber. The low pressure chamber is provided with a pressure sensor. The pressure change in the low pressure chamber is detected by the pressure sensor, and the gas permeability of the test piece is determined based on the detected pressure change.

DETAILED DESCRIPTION

Prior to describing embodiments of a measuring method and a measuring apparatus, the following explains the principle of measuring gas permeability of a test film by the measuring method and the measuring apparatus of the embodiments.

1. Explanation on Principle

Figure 1A:
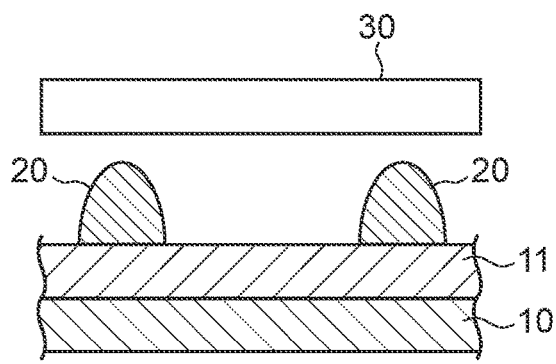
FIGS. 1A to 1D are cross-sectional views schematically showing how a shape of resist changes when a template is pressed against the resist on a substrate.

As shown in FIG. 1A, a measuring apparatus of the embodiments is, for example, an apparatus for measuring gas permeability of a test film 11 formed on a substrate 10. The substrate 10 may be a semiconductor wafer such as a silicon substrate or a translucent member, and the material thereof is not particularly limited. The test film 11 may be, for example, a film such as SOC (Spin on carbon) containing carbon and oxygen or SOG (Spin on Glass) containing silicon, but the material thereof is not particularly limited. The test film 11 is, for example, a nanometer order thin film.

Figure 1B:
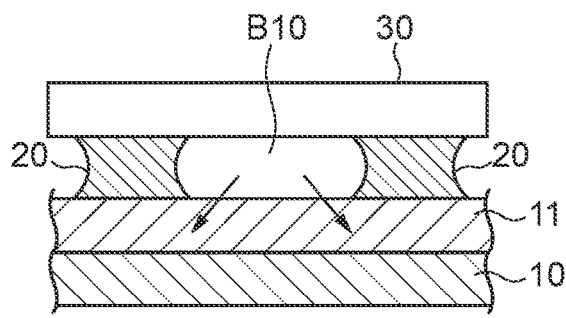
Figure 1C:
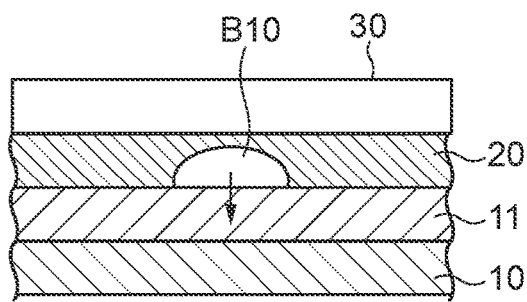
Figure 1D:
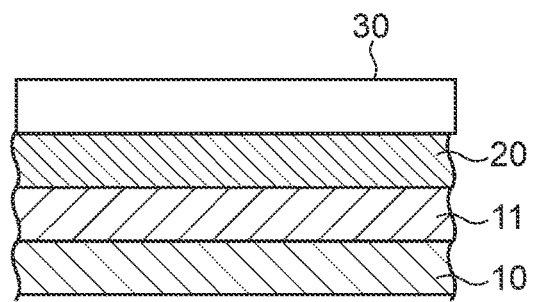

As shown in FIG. 1A, when resist 20 is dropped onto the substrate 10 at predetermined intervals and subsequently a template 30 is pressed against the resist 20, the resist 20 is gradually deformed as shown in FIGS. 1B to 1D. The template 30 may be what is called a blank template in which the bottom surface portion to be pressed against the resist 20 is formed in a flat shape and has no pattern. Here, FIGS. 1A to 1D show a cross-sectional structure of the substrate 10, and FIGS. 2A to 2D show an upper surface structure of the substrate 10 with the template 30 being removed.

Figure 2A:
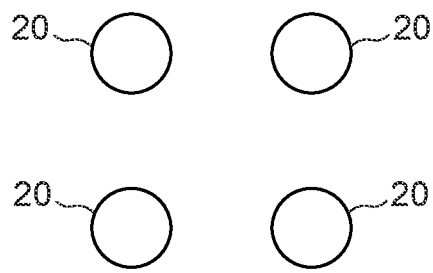
FIGS. 2A to 2D are plan views schematically showing an example of change in the shape of the resist when the template is pressed against the resist on the substrate.
Figure 2B:
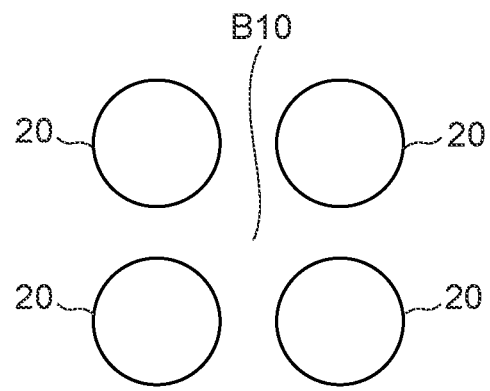
Figure 2C:
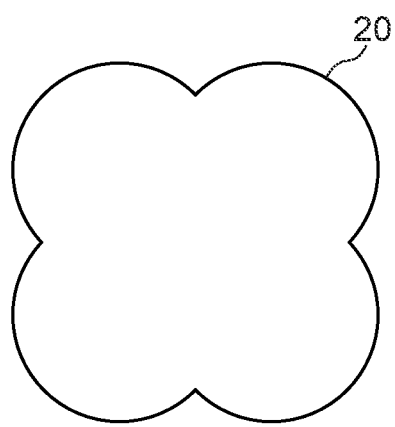
Figure 2D:
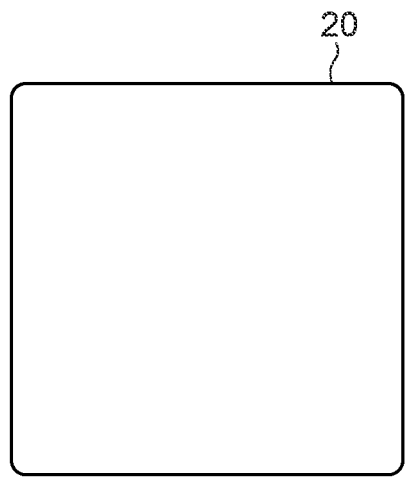

As shown in FIGS. 1B and 2B, when the template 30 is pressed against the resist 20, gas in the processing space is trapped in the void B10 formed by the test film 11, the resist 20, and the template 30. As the template 30 is pressed against the resist 20, the gas trapped in the void B10 permeates through the test film 11 and is gradually discharged to the outside. As a result, as shown in FIGS. 1C and 2C, the void B10 gradually shrinks and the resist 20 spreads on the substrate 10. When the gas trapped in the void B10 permeates through the test film 11 and is further discharged to the outside, as shown in FIGS. 1D and 2D, the resist 20 is filled on the entire surface of the substrate 10, and the void B10 disappears.

In the following, the time when the template 30 starts moving toward the resist 20 from the position shown in FIG. 1A is referred to as "start time of pressing". Further, from the start time of pressing the template 30 to the stop time of pressing the template 30 against the resist 20 is referred to as "filling time".

As shown in FIGS. 1B and 1C and FIGS. 2B and 2C, the gas trapped in the void B10 inside the resist 20 permeates through the test film 11 and is discharged to the outside. There is a correlation between: the shrinkage rate of the void B10 with respect to the filling time; and the gas permeability of the test film 11. Specifically, the higher the gas permeability of the test film 11, the faster the void B10 shrinks. This makes it possible to determine the gas permeability of the test film 11 based on the decrease rate in the volume of the void B10 with respect to the filling time.

Here, a decrease rate in the volume of the void B10 can be determined by, for example, the following method.

Figures 3A, 3B:
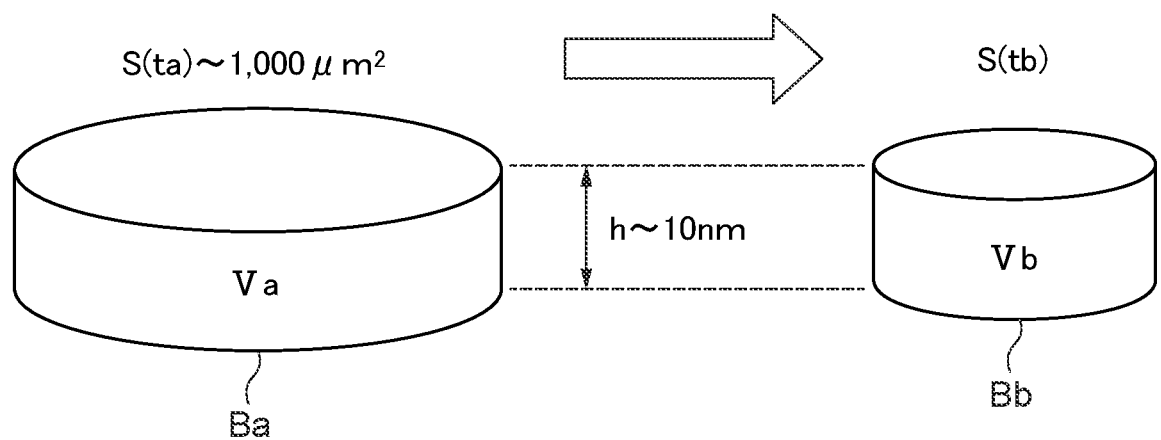
FIGS. 3A and 3B are diagrams schematically showing a change in a shape of a void formed in resist over time.

It is assumed that a void Ba as shown in FIG. 3A is formed when the template 30 is pressed against the resist 20 for a filling time ta. Then, it is assumed that a void Bb as shown in FIG. 3B is formed when the template 30 is pressed against the resist 20 for a filling time tb. Note that there is a relationship of "ta<tb" between the filling times ta and tb.

At this time, assuming that the volume of the void Ba is Va and the volume of the void Bb is Vb, the increase in the filling time from ta to tb decreases the volume of the void from Va to Vb while decreasing the area of the upper end of the void from S(ta) to S(tb). Therefore, assuming that the void Ba and the void Bb have the same height h, the relationship of the following expression f1 is established between the volume V of the void and the upper end area S. Here, "t" is a filling time.

$$V(t) = h \times S(t) \tag{f1}$$

The following expression f2 can be derived from this expression f1.

$$\frac{dV(t)}{dt} \propto \frac{dS(t)}{dt} \tag{f2}$$

Therefore, the change tendency in the volume V of the void with respect to the filling time t can be converted by the change tendency in the upper end area S of the void with respect to the filling time t. In other words, the gas permeability of the test film 11 can be determined based on the change tendency in the upper end area S2 of the void with respect to the filling time t.

2. First Embodiment

The following describes an embodiment of a measuring method and a measuring apparatus, configured based on the above principle, with reference to the drawings. In order to facilitate the understanding of the description, the same components are designated by the same reference numerals as much as possible in the respective drawings, and duplicate description is to be omitted.

2.1 Configuration of Measuring Apparatus

Figure 4:
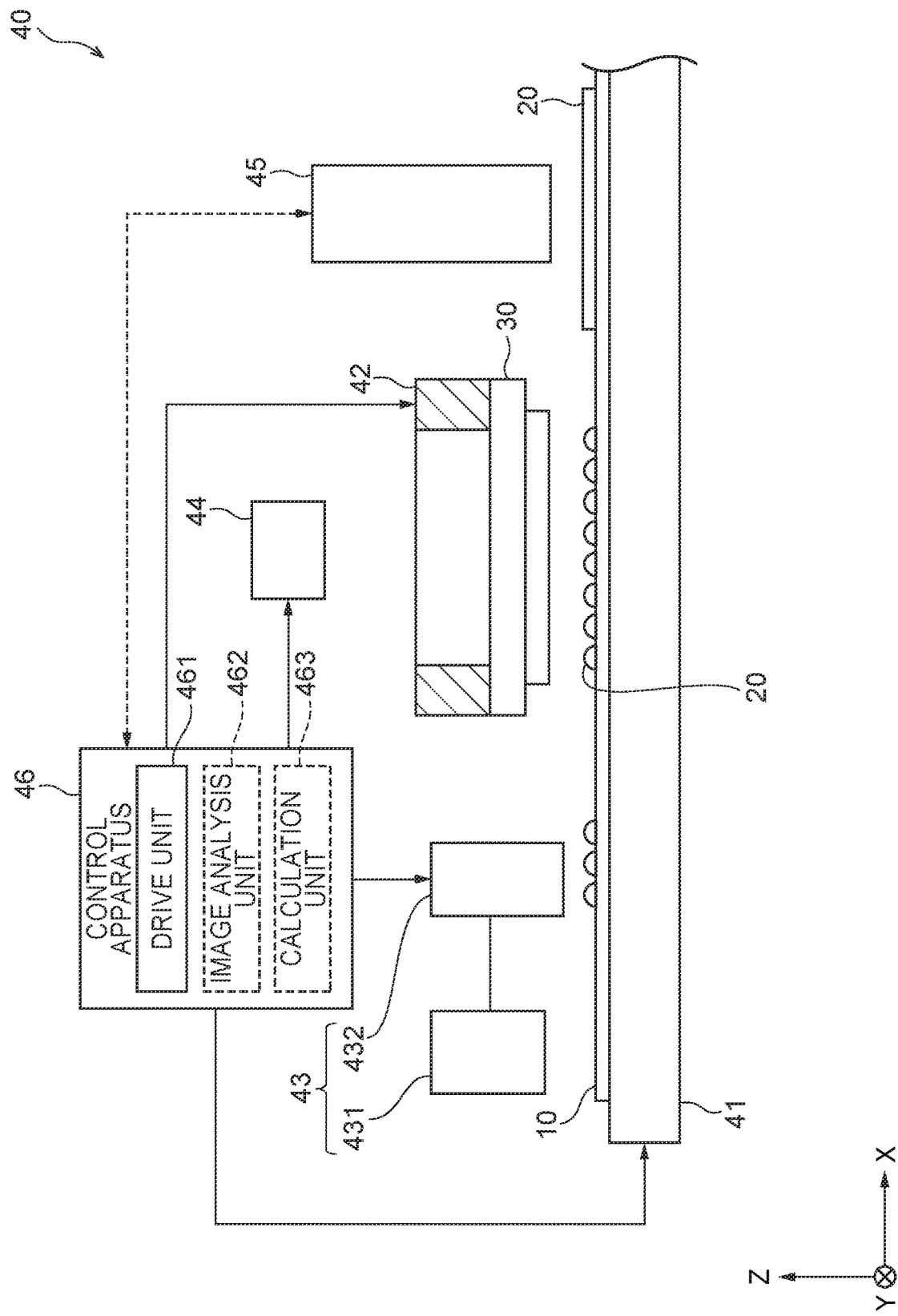
FIG. 4 is a block diagram showing a configuration of a measuring apparatus of a first embodiment.

As shown in FIG. 4, the measuring apparatus 40 of the present embodiment includes a substrate stage 41, a template stage 42, a dropping apparatus 43, an irradiation apparatus 44, an imaging apparatus 45, and a control apparatus 46.

The substrate stage 41 holds the substrate 10 by a vacuum suction force, an electrostatic force, or the like. The substrate stage 41 has a function of moving the substrate 10 in X direction and Y direction in the drawing, a function of positioning the substrate 10, and the like. The surface of the substrate 10 is formed with a test film 11 that has a nanometer order film thickness such as an SOC film as shown in FIG. 1, and that has gas permeation property.

The dropping apparatus 43 is an apparatus for dropping the resist 20 onto the substrate 10. The dropping apparatus 43 has a supply unit 431 and a dispenser 432. The supply unit 431 supplies, for example, the resist 20, which is an uncured resin, to the dispenser 432. The resist 20 is, for example, a photocurable resin such as an ultraviolet curable resin. The dispenser 432 has a plurality of nozzles, and drops the resist from these nozzles onto the substrate 10 at equal intervals. Note that the unit of the dropping amount of the dispenser 432 is "drop", and the resist amount of one drop is about 1.0 picoliter. In the present embodiment, the resist 20 corresponds to a liquid material. Further, the dropping apparatus 43 corresponds to a dropping unit.

The template stage 42 holds the template 30 by a vacuum suction force, an electrostatic force, or the like. The template 30 is made of a material capable of transmitting ultraviolet light such as quartz glass. The bottom surface of the template 30 is formed in a flat shape. The template stage 42 has a function of moving the template 30 in Z direction. This makes it possible to press the template 30 against the resist 20 on the substrate 10 and to separate the template 30 from the resist 20. In the present embodiment, the template stage 42 corresponds to a pressing unit for pressing the template 30 against the resist 20.

The irradiation apparatus 44 irradiates the resist 20 with ultraviolet light to cure the resist 20 after the template 30 is pressed against the resist 20.

The imaging apparatus 45 images the surface of the cured resist 20 from upside. The imaging apparatus 45 has a resolution of several hundred microns. For such an imaging apparatus 45, for example, an optical microscope having an imaging function can be used.

The control apparatus 46 is mainly configured with a microcomputer including a CPU, and a storage apparatus or the like. The control apparatus 46 has a drive unit 461, which is functionally configured by the CPU executing a program stored in the storage apparatus. The drive unit 461 controls the substrate stage 41, the template stage 42, the dropping apparatus 43, and the irradiation apparatus 44, to drop the resist 20 onto the substrate 10 and to press the template 30 against the resist 20.

2.2 Measuring Method of Gas Permeability

The next describes a procedure for measuring the gas permeability of the test film 11 using the measuring apparatus 40 shown in FIG. 4.

Figure 5:
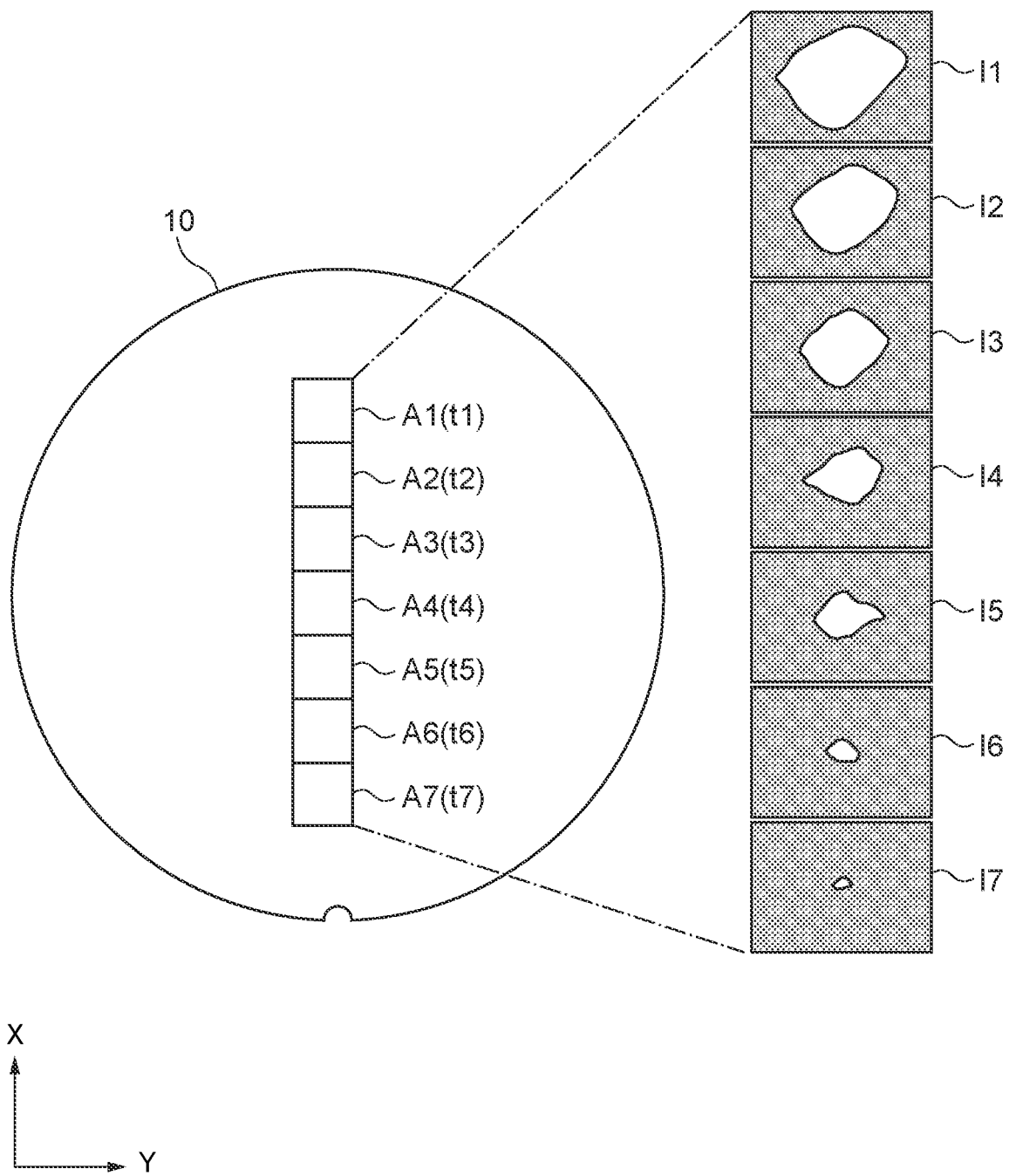
FIG. 5 is a diagram showing an example of a planar structure of a substrate of the first embodiment and image data of voids.

As shown in FIG. 5, on the surface of the substrate 10, a plurality of regions A1 to A7 in which the template 30 is pushed are set side by side in the X direction. The drive unit 461 presses the template 30 against the regions A1 to A7 of the substrate 10 for different filling times, and thereby prepares samples with states of filling the resist 20. Specifically, assuming that the respective filling times of the regions A1 to A7 are t1 to t7, the filling times t1 to t7 are set so as to satisfy a relationship of "t1<t2<t3<t4<t5<t6<t7". In the present embodiment, the filling times t1 to t7 are set to 0.9 sec, 1.0 sec, 1.1 sec, 1.2 sec, 1.3 sec, 1.5 sec, and 1.7 sec, respectively.

Figure 6:
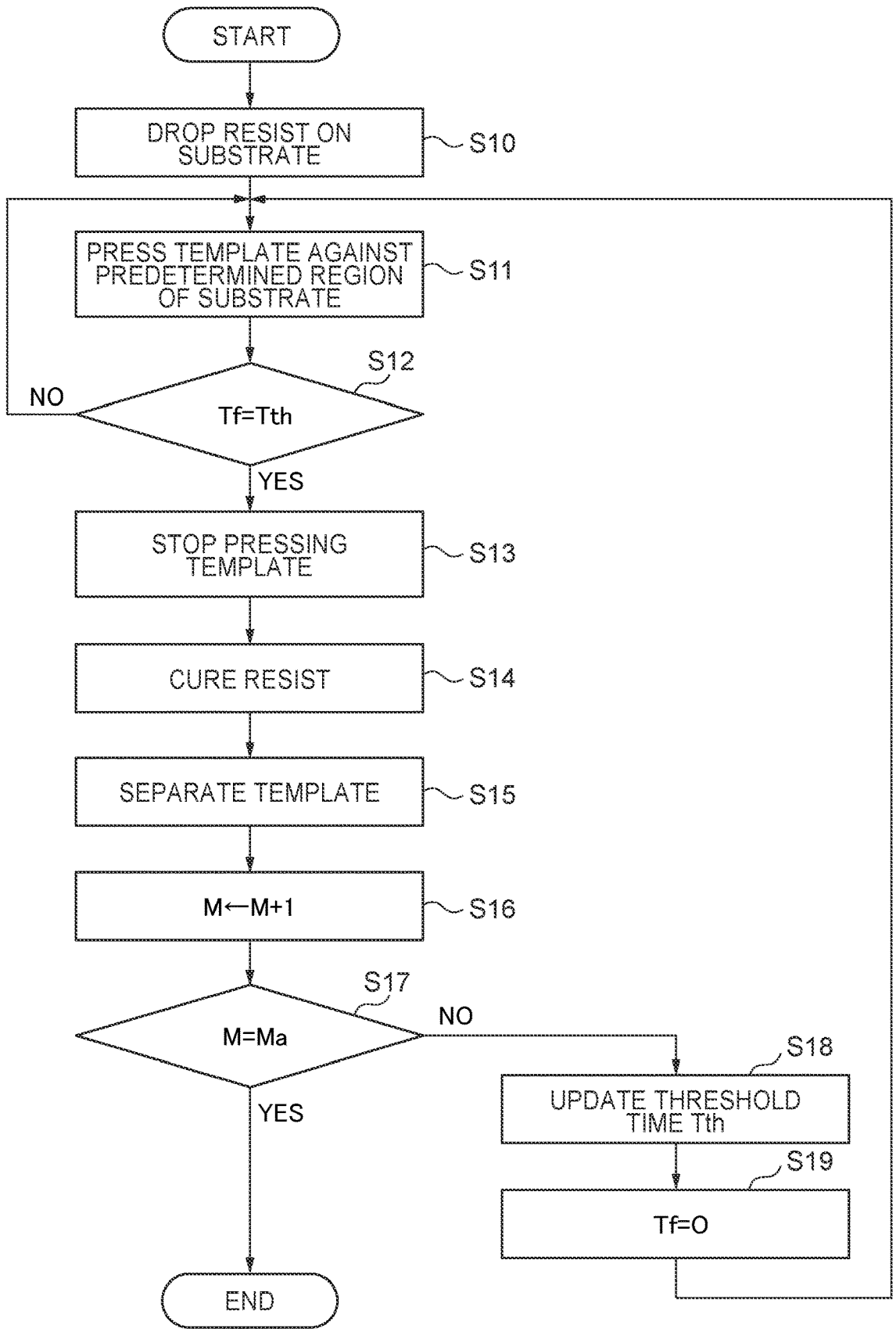
FIG. 6 is a flowchart showing an operation example of the measuring apparatus of the first embodiment.

FIG. 6 shows an example of a procedure for preparing a sample with a state of filling the resist 20 by the drive unit 461.

Figure 7:
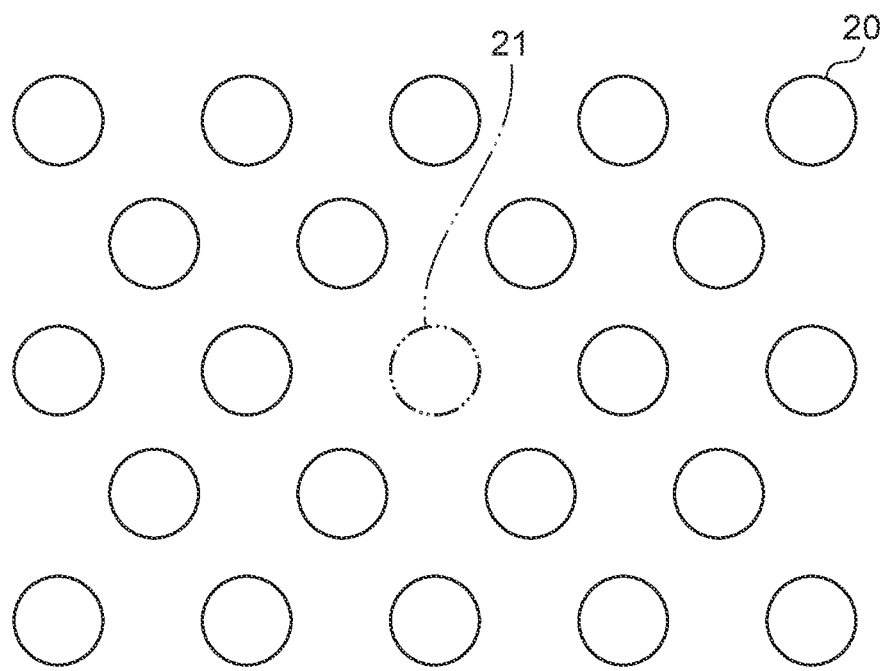
FIG. 7 is a diagram schematically showing an example of a method for dropping resist onto a substrate according to the first embodiment.

As shown in FIG. 6, the drive unit 461 first drops the resist 20 from the dropping apparatus 43 toward the substrate 10 while driving the substrate stage 41, and thereby drops the resist 20 onto the regions A1 to A7 of the substrate 10 (step S10). At this time, the drive unit 461 places the resist 20 on the regions A1 to A7 of the test film 11 at equal intervals so as to partially provide a missing portion 21 in which the resist 20 is not placed, as shown in FIG. 7.

Subsequently, the drive unit 461 drives the substrate stage 41 to move the region A1 of the substrate 10 to the downside of the template 30, and then moves the template stage 42 downward toward the region A1 of the substrate 10. Thereby, the drive unit 461 presses the template 30 against the resist 20 at a predetermined pressure Pf (step S11). Here, the predetermined pressure Pf is a preset constant pressure.

Subsequently, the drive unit 461 determines whether the count time Tf from the start time of pressing the template 30 has reached a threshold time Tth (step S12). The initial value of the threshold time Tth is set to the filling time t1. If the count time Tf has not reached the threshold time Tth (step S12: NO), the drive unit 461 returns to the step S11 and continues pressing the template 30 against the resist 20.

If the count time Tf reaches the threshold time Tth (step S12: YES), the drive unit 461 stops pressing the template 30 against the resist 20 (step S13). Subsequently, the drive unit 461 irradiates the resist 20 with ultraviolet light from the irradiation apparatus 44 to cure the resist 20 (step S14), and then separates the template 30 from the resist 20 (step S15). As described above, the drive unit 461 prepares the sample P1 in the state of filling the resist 20 when pressing the template 30 against the region A1 of the substrate 10 for the filling time t1.

Subsequently, the drive unit 461 increments the number of pressing time M (step S16), and then determines whether the number of pressing time M has reached a predetermined number of times Ma (step S17). In the present embodiment, the predetermined number of times Ma is set to 7 corresponding to the number of regions A1 to A7. Further, the initial value of the number of pressing time M is set to zero. If the number of pressing time M has not reached the predetermined number of times Ma (step S17: NO), the drive unit 461 updates the threshold time Tth (step S18). For example, if the current threshold time Tth is set to the filling time t1, the drive unit 461 changes the threshold time Tth to the filling time t2. The drive unit 461 updates the threshold time Tth in the order of t1→t2→t3→t4→t5→t6→t7 each time the process of the step S18 is executed.

Following the process of the step S18, the drive unit 461 initializes the value of the count time Tf (step S19) and subsequently returns to the process of the step S11. At this time, the drive unit 461 processes the steps S11 to S15 again, to press the template 30 against the region A2 of the substrate 10 for the filling time t2 and subsequently to cure the resist 20. This makes it possible to obtain a sample P2 in the state of filling the resist 20 when the template 30 is pressed against the region A2 of the substrate 10 for the filling time t2.

The processes of the steps S11 to S10 is repeated until the number of pressing time M reaches a predetermined number of times Ma. This makes it possible to obtain the samples P1 to P7 in the states of filling the resist 20 when the template 30 is pressed against the regions A1 to A7 of the substrate 10 for the filling times t1 to t7, respectively.

Figure 8:
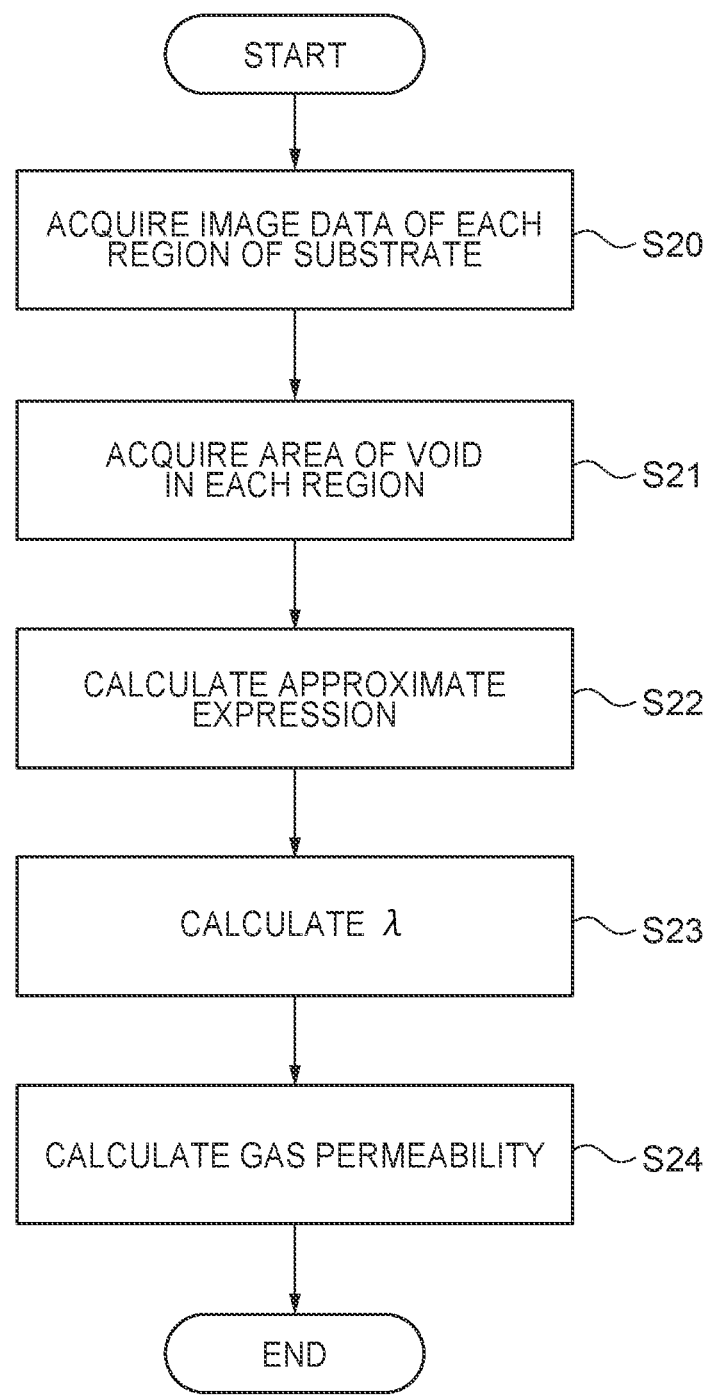
FIG. 8 is a flowchart showing a procedure of calculating gas permeability of the first embodiment.

In this way, after the samples P1 to P7 are obtained respectively in the states of filling the resist 20 corresponding to the filling times t1 to t7, the gas permeability of the test film 11 is calculated through the steps shown in FIG. 8.

First, the imaging apparatus 45 images the samples P1 to P7 in the states of filling the resist 20 respectively corresponding to the filling times t1 to t7. Thereby, image data I1 to I7 respectively corresponding to the regions A1 to A7 as shown in FIG. 5 are acquired (step S20). Here, in the image data I1 to I7 shown in FIG. 5, the region filled with the resist 20 is indicated in point hatching, and the region where the void is formed is indicated in white.

Subsequently, image analysis determines the area of the portion indicated in the point hatching in the image data I1 to I7 shown in FIG. 5, and thereby the areas S1 to S7 of voids respectively corresponding to the filling times t1 to t7 are acquired (step S21 in FIG. 8).

Figure 9:
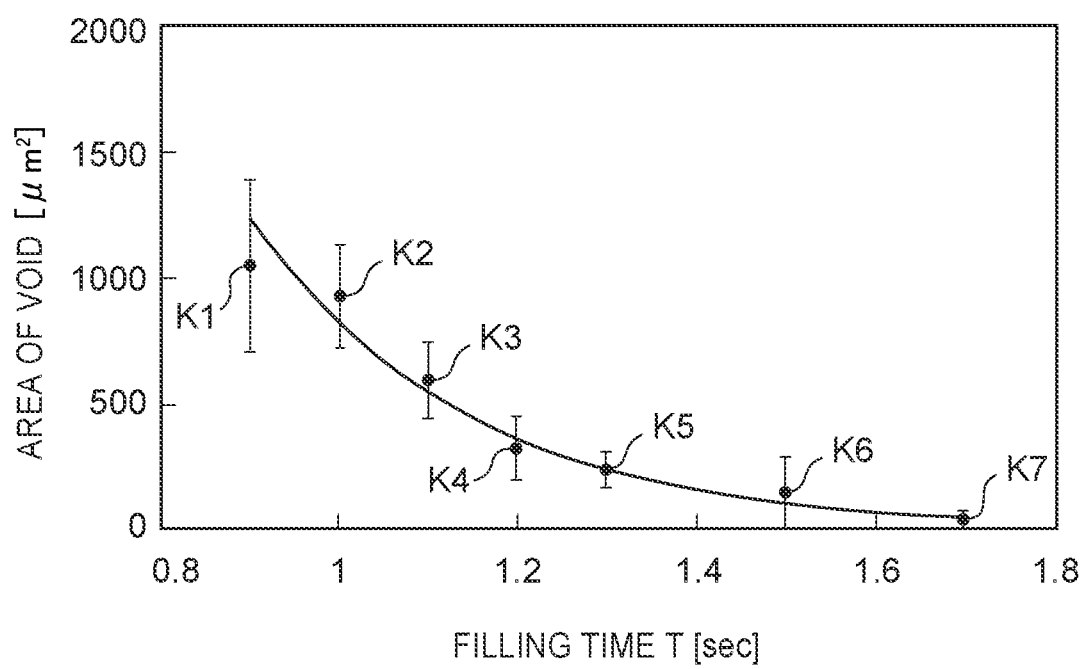
FIG. 9 is a graph showing a relationship between filling time of a template and area of a void formed in resist.

FIG. 9 shows the relationship between the areas S1 to S7 of voids and the filling times t1 to t7. Note that, in FIG. 9, error bars indicate variations in respective distributions of the areas S1 to S7 of voids in which each variation is acquired from a plurality of samples, which are prepared by the procedure shown in FIG. 6. Further, black circles K1 to K7 indicate average values of the areas S1 to S7 of voids in which each average value is obtained from the plurality of samples.

Next, the measured values K1 to K7 shown in FIG. 9 are used to calculate an approximate function of the area S of the void (step S22 in FIG. 8). Specifically, as shown in FIG. 9, a relationship can be seen in which the area S of the void decreases approximately exponentially with respect to the filling time t. In other words, the right side of the above expression f2 can be approximated by the following expression f3. Here, "λ" is a predetermined coefficient.

$$\frac{dS(t)}{dt} = -\lambda \times S(t) \tag{f3}$$

Therefore, the area S of the void can be expressed by the following expression f4. In the expression f4, "A" is a predetermined coefficient.

$$S(t) = A \times e^{-\lambda t} \tag{f4}$$

Note that a solid line m11 shown in FIG. 9 indicates an approximate curve obtained by approximating the measurement points K1 to K7 with the expression f4.

The larger the gas permeability of the test film 11, the faster the area S of the void shrinks with respect to the filling time t. In other words, the coefficient λ of the expression f4 becomes a larger value. Contrarily, the smaller the gas permeability of the test film 11, the slower the area S of the void shrinks with respect to the filling time t. In other words, the coefficient λ of the expression f4 becomes a smaller value.

Figure 10:
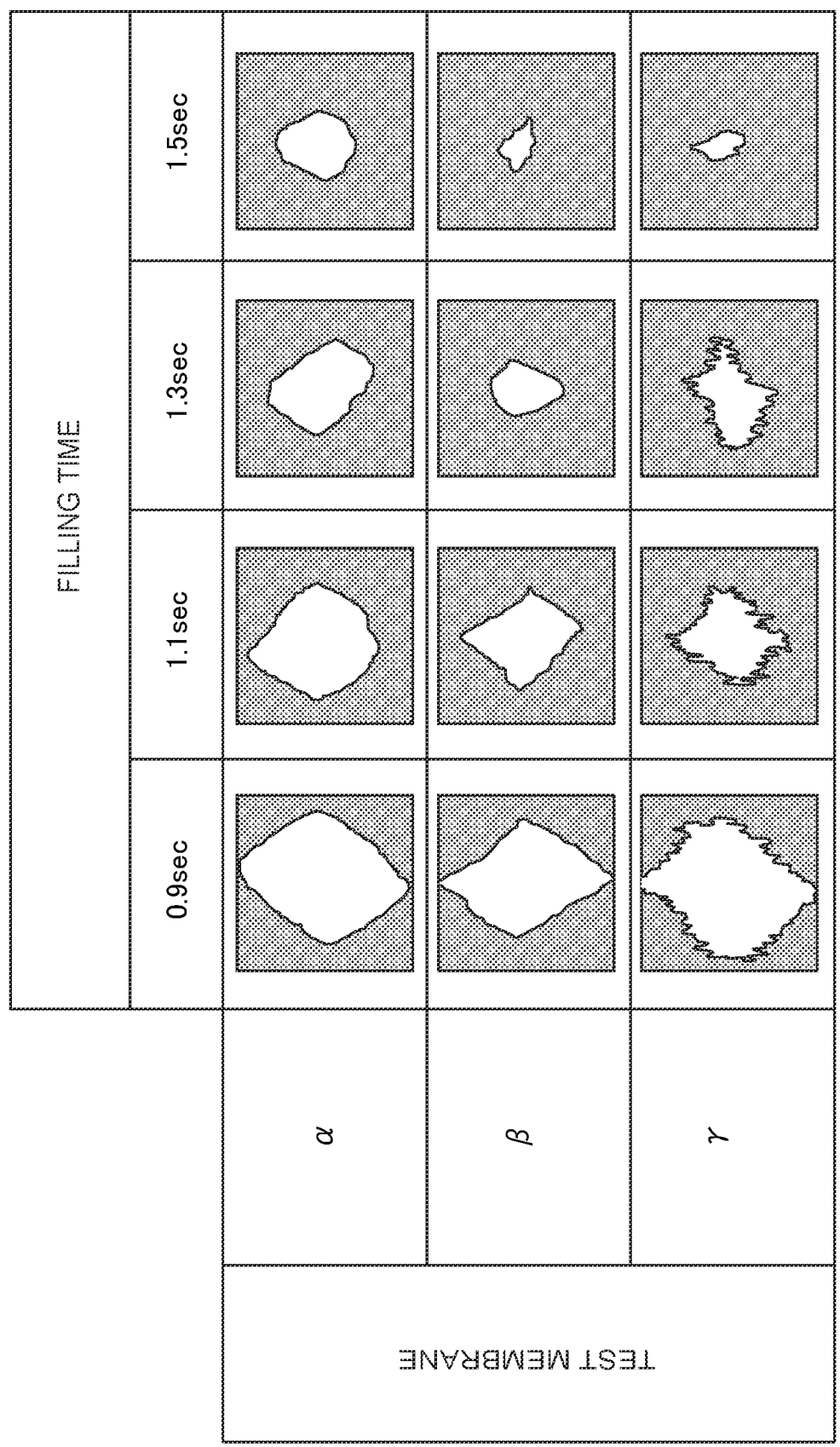
FIG. 10 is a diagram showing an example of image data of voids formed in three test films α, β, and γ having different gas permeability.

More specifically, it is assumed that areas of voids S are measured with respect to the filling times t using test films α, β, and γ having different gas permeability, thereby obtaining experimental results as shown in FIG. 10. Here, the test films α, β, and γ becomes higher in gas permeability in this order. As shown in FIG. 10, the test film γ having the highest gas permeability has a faster rate at which the area of the void shrinks than the other test films α and β.

Figure 11:
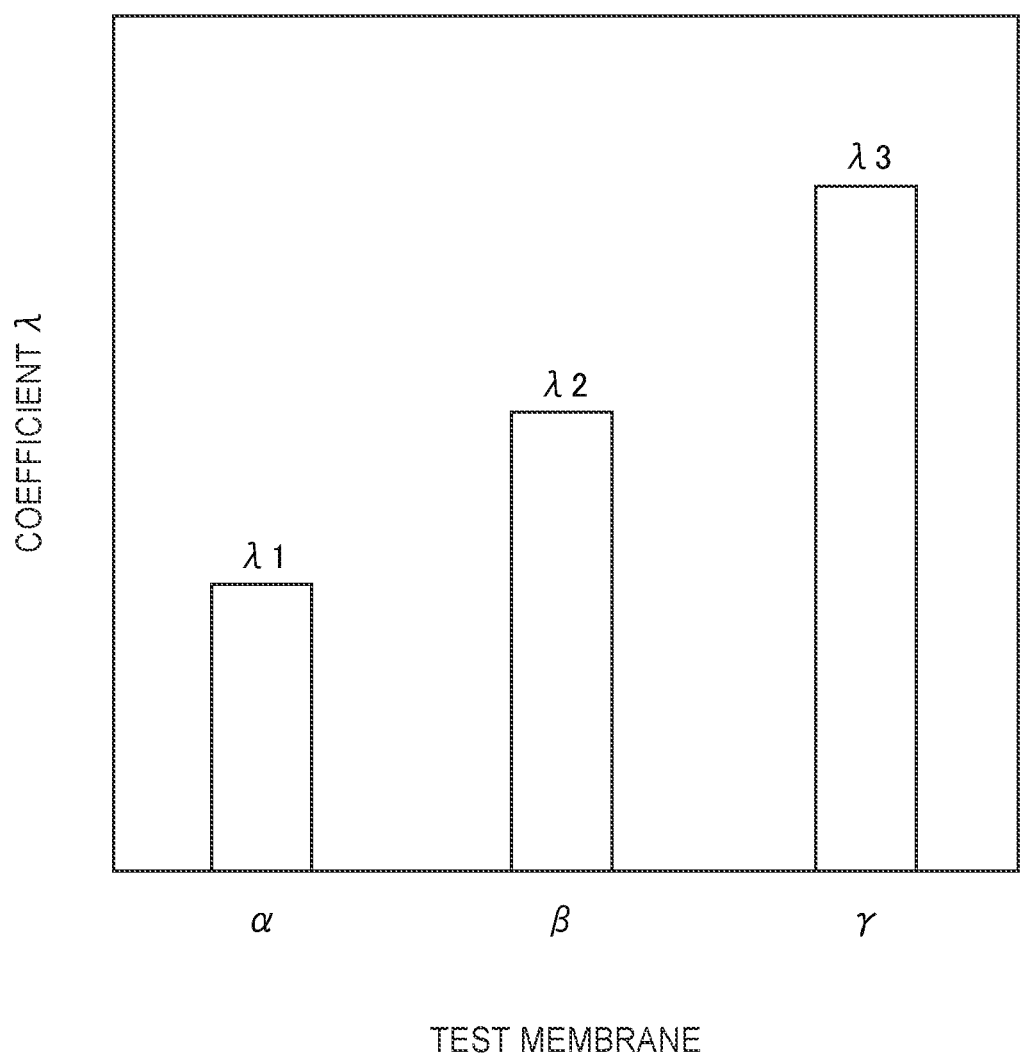
FIG. 11 is a bar graph showing a relationship between the three test films α, β, and γ having different gas permeability and coefficients λ.

Respective coefficients λ1, λ2, λ3 of the test films α, β, and γ can be calculated from the experimental results shown in FIG. 10, so that calculation results can be obtained as shown in FIG. 11. As shown in FIG. 11, the coefficient λ3 corresponding to the test film γ having the highest gas permeability is higher than the coefficients λ1 and λ2 respectively corresponding to the other test films α and β. Thus, there is a correlation between the coefficient λ and the gas permeability of the test film.

As described above, the gas permeability of the test film 11 is determined from the measured values K1 to K7 of the area of the void. In other words, as shown in FIG. 8, following the step S21, an approximate function satisfying the above f4 is determined from the measured values K1 to K7 of the area of the void shown in FIG. 9 (step S22), and then the coefficient λ is calculated from the determined approximate function (step S23). Subsequently, the gas permeability of the test film 11 is calculated based on the value of the coefficient λ (step S24). Note that, if the relationship between the coefficient λ and the gas permeability is determined in advance by experiments or the like, and these relationships are mapped or formulated, the gas permeability of the test film 11 can be calculated from the coefficient λ.

2.3 Effects

In the measuring method of the present embodiment, the resist 20 is placed on the surface of the test film 11; the template 30 is pressed against the resist 20 placed on the surface of the test film 11; measuring a size of a void formed in the resist 20 after pressing the template 30 against the resist 20; and the gas permeability of the test film 11 is determined based on the size of the void.

According to this method, for example, if measurement is performed on gas permeability of the test film 11 having a nanometer order film thickness, the test film 11 does not need to be provided with a support film or the like. Consequently, the support film or the like does not affect the measurement accuracy of gas permeability. This makes it possible to determine the gas permeability of the test film 11 with higher accuracy.

In the measuring method of the present embodiment, when the size of the void is measured, the voids formed in the resist 20 are imaged by the imaging apparatus 45, and the size of the void, specifically, the upper end area of the void is measured based on the image data of the void captured by the imaging apparatus 45.

According to this method, the size of the void can be measured with higher accuracy, so that the calculation accuracy of the gas permeability can be improved.

In the measuring method of the present embodiment, the template 30 is pressed against the uncured resist 20, and the resist 20 is irradiated with light such as ultraviolet rays to be cured; the template 30 is separated from the cured resist 20; the area of voids formed in the resist 20 is measured.

According to this method, the area of the void can be easily measured.

In the measurement method of the present embodiment, when the resist 20 is dropped onto the test film 11 in a preset placement, a missing portion 21 in which the resist 20 is not placed is partially provided.

According to this method, the void can be intentionally formed in the resist 20, so that the area of the void can be easily measured.

In the measuring method of the present embodiment, the change in the area of the void is measured with respect to the filling time of the template 30; based on the measurement result, the approximate function of the area of the void with respect to the filling time is determined by the exponential approximation shown in the above expression f4. Then, the gas permeability of the test film 11 is determined based on the coefficient λ, which is a parameter of the determined approximate function.

According to this method, simply measuring a plurality of relationships between the filling time of the template 30 and the area of the void makes it possible to calculate the gas permeability of the test film 11.

3. Second Embodiment

The next describes a second embodiment of the measuring apparatus 40. The following mainly describes the differences from the measuring apparatus 40 of the first embodiment.

3.1 Configuration of Measuring Apparatus

The measuring apparatus 40 of the present embodiment is different from the measuring apparatus 40 of the first embodiment in that the measuring apparatus 40 performs all the steps from the preparation of the sample in the state of filling the resist 20 to the calculation of the gas permeability of the test film 11.

Specifically, the imaging apparatus 45 shown in FIG. 4 transmits the image data obtained by imaging the resist 20 to the control apparatus 46.

Further, as shown by a broken line in FIG. 4, the control apparatus 46 further includes an image analysis unit 462 and a calculation unit 463, which are functionally configured by the CPU executing a program stored in the storage apparatus.

The image analysis unit 462 images the respective regions A1 to A7 of the substrate 10 with the imaging apparatus 45, performs image analysis on the captured image data, and thereby calculates the areas S1 to S7 of voids formed in the respective regions A1 to A7 of the substrate 10.

The calculation unit 463 uses the areas S1 to S7 of voids calculated by the image analysis unit 462 and the corresponding filling times t1 to t7 to calculate the gas permeability of the test film 11.

3.2 Operation Example of Measuring Apparatus

Figure 12:
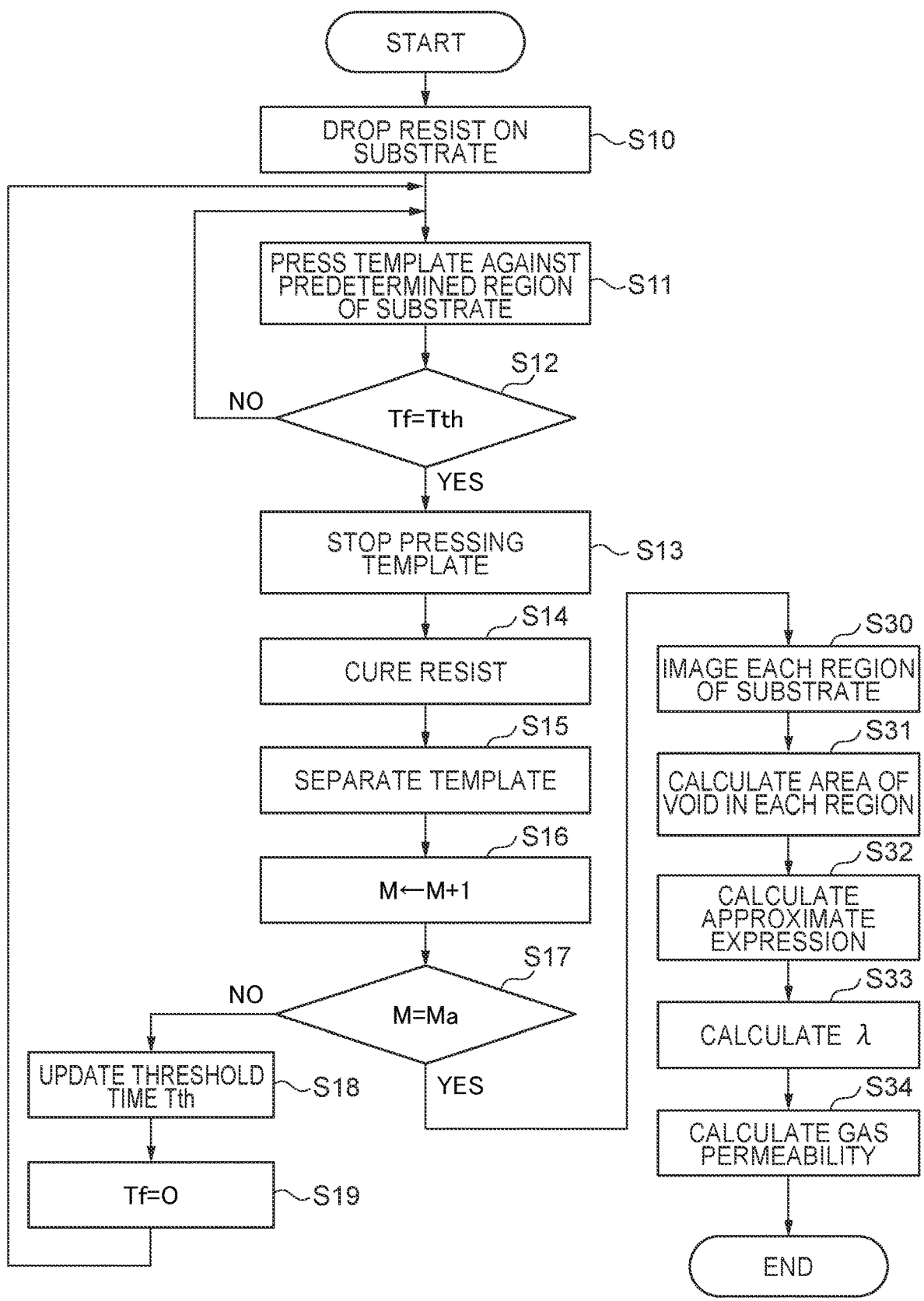
FIG. 12 is a flowchart showing an operation example of a measuring apparatus of a second embodiment.

The next describes an operation example of the drive unit 461, the image analysis unit 462, and the calculation unit 463 with reference to FIG. 12. Note that, in the process shown in FIG. 12, the same processes as those shown in FIG. 6 are designated by the same reference numerals, and duplicate explanations are to be omitted as much as possible.

As shown in FIG. 12, when the positive determination is made in step S17 (step S17: YES), the image analysis unit 462 moves the substrate 10 in the X direction to sequentially position the regions A1 to A7 of the substrate 10 on downside of the imaging apparatus 45, and drives the imaging apparatus 45 to image the respective regions A1 to A7 of the substrate 10 (step S30). Further, the image analysis unit 462 performs a predetermined image analysis on the image data I1 to I7 obtained by imaging the respective regions A1 to A7 of the substrate 10, and thereby calculates the areas S1 to S7 of voids formed in the respective regions A1 to A7 (step S31). So, in the present embodiment, the image analysis unit 462 corresponds to a measuring unit for measuring the size of the void.

Subsequently, the calculation unit 463 determines an approximate function of the above expression f4 based on: the areas S1 to S7 of voids calculated by the image analysis unit 462; and the corresponding filling times t1 to t7 (step S32), and calculates the coefficient λ based on the determined approximate function (step S33). Further, the calculation unit 463 calculates the gas permeability of the test film 11 from the coefficient λ based on a map, a calculation expression, or the like (step S34).

3.3 Effect

The measuring apparatus 40 of the present embodiment includes a dropping apparatus 43, a template stage 42, an image analysis unit 462, and a calculation unit 463. The dropping apparatus 43 drops the resist 20 onto the test film 11. The template stage 42 presses the template 30 against the resist 20 dropped on the surface of the test film 11. After the template 30 is pressed against the resist 20, the image analysis unit 462 measures the area of voids formed in the resist 20. The calculation unit 463 calculates the gas permeability of the test film 11 based on the area of the void.

This configuration makes it possible to automatically determine the gas permeability of the test film 11, thereby improving the convenience.

3.4 First Modification

The next describes a first modification of the measuring apparatus 40 of the second embodiment.

Figure 13:
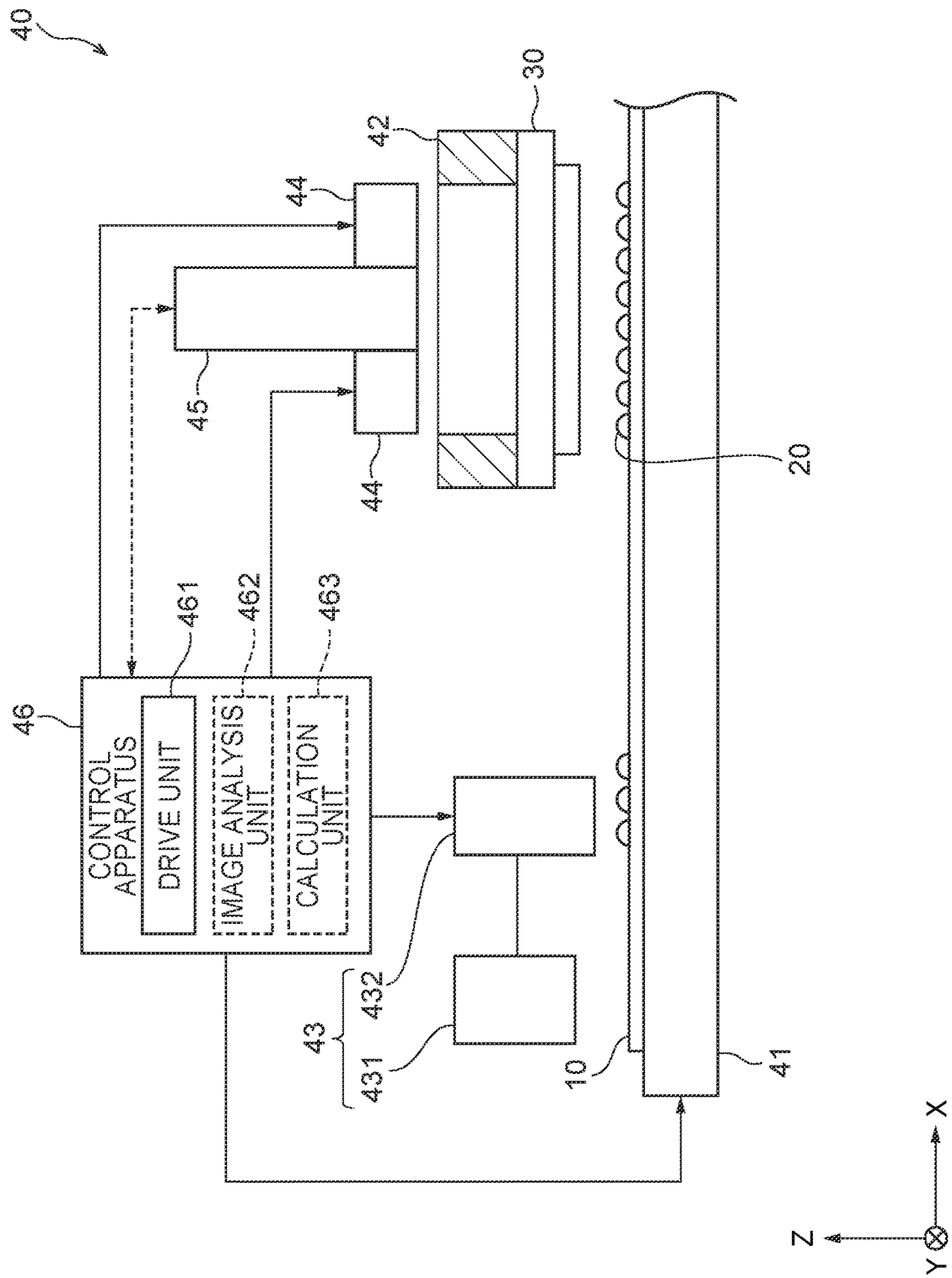
FIG. 13 is a block diagram showing a configuration of a measuring apparatus of a first modification of the second embodiment.

As shown in FIG. 13, in this modification, the imaging apparatus 45 is provided on upside of the template stage 42. When the template 30 is pressed against the resist 20 on the substrate 10, that is, when the resist 20 is in an uncured state, the imaging apparatus 45 images the state of filling the resist 20 through the template 30. The template 30 is made of a transparent material so that the resist 20 can be imaged by the imaging apparatus 45.

Figure 14:
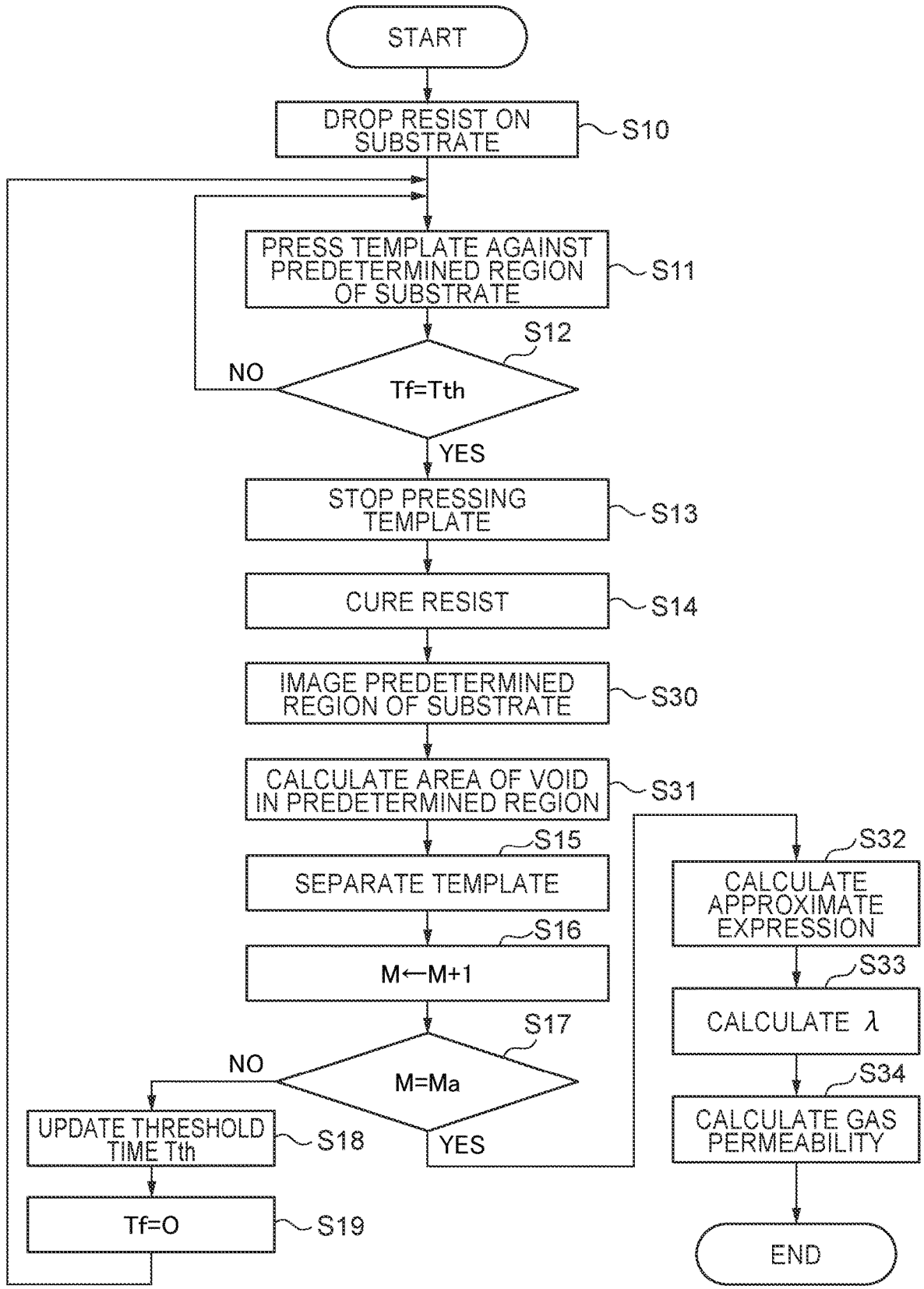
FIG. 14 is a flowchart showing an operation example of the measuring apparatus of the first modification of the second embodiment.

FIG. 14 shows an operation example of the drive unit 461, the image analysis unit 462, and the calculation unit 463 of this modification.

As shown in FIG. 14, in this modification, for example, the drive unit 461 stops pressing the template 30 against the region A1 of the substrate 10 (step S13) and cures the resist 20 (step S14). Then, the image analysis unit 462 images the region A1 of the substrate 10 (step S30). Further, the image analysis unit 462 performs image analysis on the image data obtained by imaging, to calculate the area S1 of the void formed in the region A1 (step S31). After that, the processes after the step S15 are executed.

As described above, in the measuring apparatus 40 of this modification, the template 30 is pressed against the uncured resist 20, and the resist 20 is irradiated with ultraviolet light to be cured. Then, before the template 30 is separated from the cured resist 20, the area of voids formed in the resist 20 is measured. This makes it possible to measure the area of the void earlier to improve the calculation speed of the gas permeability of the test film 11.

3.5 Second Modification

The next describes a second modification of the measuring apparatus 40 of the second embodiment.

In this modification, the configuration shown in FIG. 13 is used for the configuration of the measuring apparatus 40.

Figure 15:
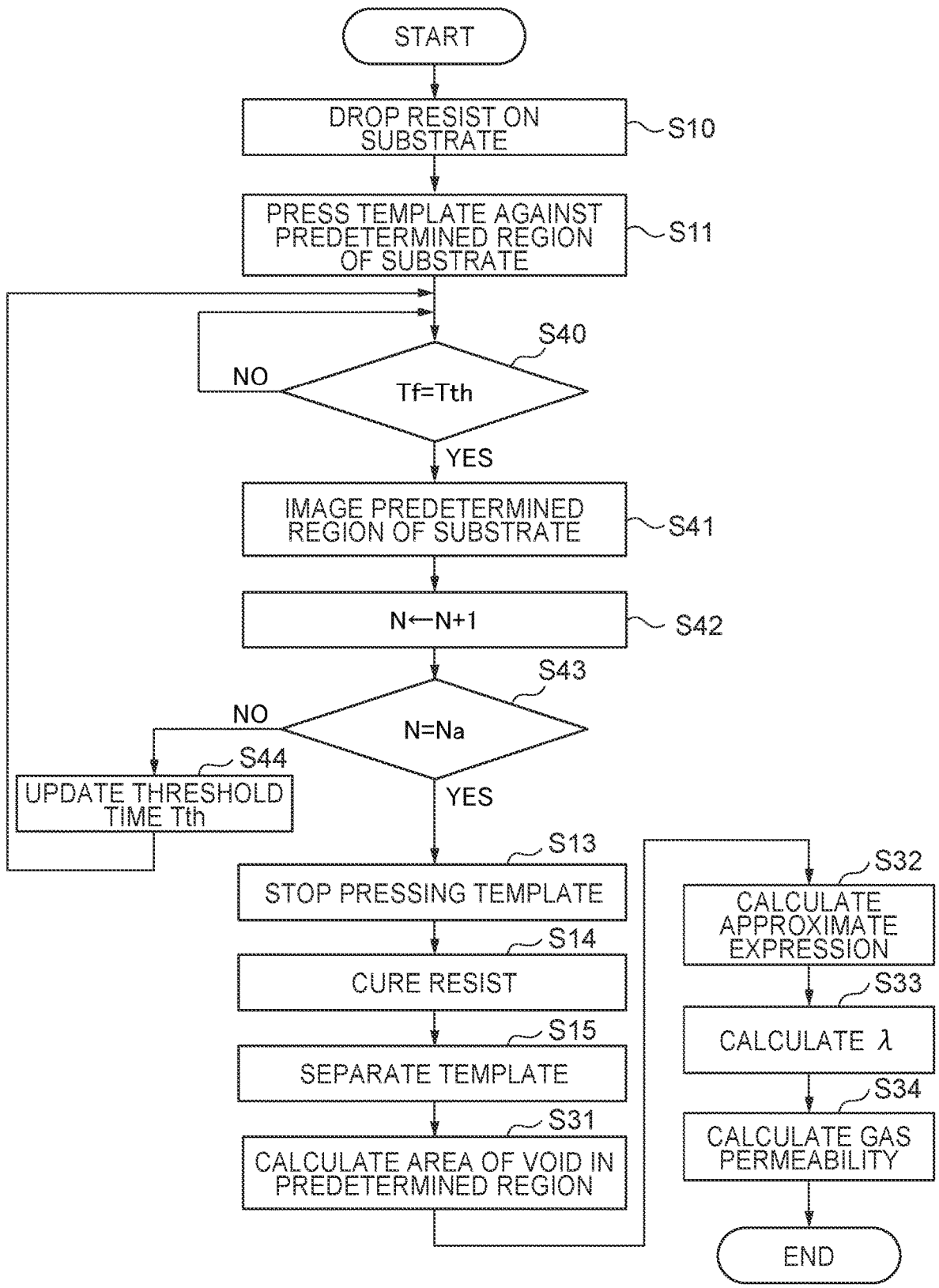
FIG. 15 is a flowchart showing an operation example of a measuring apparatus of a second modification of the second embodiment.

On the other hand, the drive unit 461, the image analysis unit 462, and the calculation unit 463 of this modification operate as shown in FIG. 15.

As shown in FIG. 15, in this modification, the drive unit 461 moves the template 30 toward the substrate 10 (step S11), and determines whether the count time Tf from the start time of pressing the template 30 has reached the threshold time Tth (step S40). The initial value of the threshold time Tth is set to the filling time t1. When the count time Tf reaches the threshold time Tth (step S40: YES), the image analysis unit 462 images the substrate 10 with the imaging apparatus 45, and acquires the image data I1 of the state of filling the resist 20 corresponding to the filling time t1 (step S41). Subsequently, the drive unit 461 increments the number N of acquiring image data (step S42), and then determines whether the number N of acquiring image data has reached a predetermined number Na (step S43). Note that, in this modification, the predetermined number Na is set to 7. Further, the initial value of the number N of acquiring the image data is set to zero.

When the number N of acquiring the image data does not reach the predetermined number Na (step S43: NO), the drive unit 461 updates the threshold time Tth (step S44). The process of the step S44 is the same as the process of the step S18 of FIG. 6. The drive unit 461 returns to the process of the step S40 following the process of the step S44. As a result, the threshold time Tth is updated, and the image data of the state of filling the resist 20 is sequentially acquired. This makes it possible to acquire all the image data I1 to I7 of the state of filling the resist 20 respectively corresponding to the filling times t1 to t7, during the period in which the template 30 is pressed against one region of the substrate 10.

When the number N of acquiring the image data reaches a predetermined number Na (step S42: YES), the drive unit 461 stops pressing the template 30 against the resist 20 (step S13). Subsequently, the drive unit 461 cures the resist 20 (step S14), and then separates the template 30 from the resist 20 (step S15). Subsequently, the image analysis unit 462 executes the process of the step S31, and the calculation unit 463 further executes the process of the steps S32 to S34 to calculate the gas permeability of the test film 11.

As described above, the measuring apparatus 40 of this modification measures the area of the void formed in the resist 20 when the template 30 is pressed against the uncured resist 20. This makes it possible to measure the area of the void earlier to improve the calculation speed of the gas permeability of the test film 11.

4. Other Embodiments

The present disclosure is not specifically limited to the above. Although some embodiments of the present invention have been described, these embodiments are presented as examples and are not intended to limit the scope of the invention. These novel embodiments can be implemented in various other embodiments, and various omissions, replacements, and changes can be made without departing from the gist of the invention. These embodiments and variations thereof are included in the scope and gist of the invention, and are included in the scope of the invention described in the claims and the equivalent scope thereof.

What is claimed is:

1. A measuring method, comprising:
   placing a liquid material on a surface of a test film;
   pressing a template against the liquid material placed on the surface of the test film;
   measuring a size of a void formed in the liquid material after pressing the template against the liquid material; and
   determining gas permeability of the test film based on the size of the void.

2. The measuring method according to claim 1, wherein in measuring the size of the void, the void formed in the liquid material is imaged by an imaging apparatus, and the size of the void is measured based on image data of the void captured by the imaging apparatus.

3. The measuring method according to claim 2, wherein an area of the void is calculated based on the image data of the void, and the area of the void is measured as the size of the void.

4. The measuring method according to claim 1, wherein the liquid material is a photocurable resin.

5. The measuring method according to claim 4, wherein the template is pressed against the photocurable resin that is uncured, and subsequently the photocurable resin is irradiated with light to be cured, and
   the template is separated from the cured photocurable resin, and subsequently a size of a void formed in the photocurable resin is measured.

6. The measuring method according to claim 4, wherein the template is pressed against the photocurable resin that is uncured, and subsequently the photocurable resin is irradiated with light to be cured, and
   a size of a void formed in the cured photocurable resin is measured, and subsequently the template is separated from the photocurable resin.

7. The measuring method according to claim 1, wherein a size of a void formed in the liquid material is measured when the template is pressed against the liquid material.

8. The measuring method according to claim 1, wherein a missing portion where the liquid material is not dropped is provided in a part of the test film when the liquid material is dropped onto the test film in a preset placement.

9. The measuring method according to claim 1, wherein when time during which the template is pressed against the liquid material to be filled is defined as filling time,
change in size of the void is measured with respect to the filling time of the template,
based on results of the measurement, an approximate function of size of the void with respect to the filling time of the template is determined by exponential approximation, and
based on a parameter of the approximate function, gas permeability of the test film is determined.

10. A measuring apparatus, comprising:
a dropping unit for dropping a liquid material onto a test film;
a pressing unit for pressing a template against the liquid material dropped on a surface of the test film;
a measuring unit for measuring a size of a void formed in the liquid material after the template is pressed against the liquid material; and
a calculation unit for calculating gas permeability of the test film, based on the size of the void.

* * * * *